United States Patent [19]

Goel et al.

[11] 4,030,968

[45] June 21, 1977

[54] DISPOSAL OF PAPER PULP MILL SLUDGE

[75] Inventors: Krishan N. Goel, Grand Mere; Osman J. Walker, St. Lambert, both of Canada

[73] Assignee: Consolidated-Bathurst Limited, Montreal, Canada

[22] Filed: July 1, 1976

[21] Appl. No.: 701,611

Related U.S. Application Data

[63] Continuation-in-part of Ser. No. 645,421, Dec. 30, 1975, abandoned.

[30] Foreign Application Priority Data

Dec. 22, 1975 Canada .............................. 242540

[52] U.S. Cl. .................................... 162/16; 162/29; 162/39; 162/72; 162/DIG. 9; 210/4; 210/5; 210/6; 210/7; 210/15; 210/66; 210/68
[51] Int. Cl.² .................. D21C 3/22; D21C 11/00; C02C 5/10
[58] Field of Search ........... 162/16, 29, 30 R, 30 K, 162/31, 37, 39, 38, 72, 189, DIG. 9; 210/3, 4, 5, 6, 7, 15, 60, 63 R, 64, 66, 68, 70, 71, 73 R, 73 S

[56] References Cited

UNITED STATES PATENTS

| 1,743,080 | 1/1930 | Bradley et al. ...................... 162/16 |
|---|---|---|
| 3,025,151 | 3/1962 | Berg et al. ........................ 210/15 X |
| 3,402,125 | 9/1968 | Tanaka ................................... 210/7 |
| 3,444,076 | 5/1969 | Sekikawa et al. ................. 210/7 X |
| 3,737,374 | 6/1973 | Stern et al. ...................... 210/15 X |
| 3,806,448 | 4/1974 | Smith et al. .......................... 210/6 |
| 3,876,497 | 4/1975 | Hoffman ................... 162/DIG. 9 X |

FOREIGN PATENTS OR APPLICATIONS

984,182 2/1965 United Kingdom ............... 162/189

OTHER PUBLICATIONS

Biological Treatment of Sewage & Industrial Wastes, vol. I, McCabe, p. 350, 1955, Gp.170.

Primary Examiner—Arthur L. Corbin
Attorney, Agent, or Firm—Lawrence I. Field

[57] ABSTRACT

A process for the disposal of paper pulp mill sludge by incorporating the sludge in the digestion step of a wood pulping operation without detrimental effects on the quality of the pulp obtained. In one aspect, the sludge is surplus sludge which is obtained from a system which microbiologically purifies spent wood pulping liquor by aeration and sedimentation.

12 Claims, No Drawings

DISPOSAL OF PAPER PULP MILL SLUDGE

This application is a Continuation-in-Part of U.S. Patent Application Ser. No. 645,421, filed Dec. 30, 1975, now abandoned.

The present invention relates to a process for the disposal of sludge; in a particular aspect, the invention relates to a process for the treatment of sludge from pulp and paper mills and in a preferred aspect, derives a purification process for wood pulping liquor effluent followed by disposal of the surplus sludge from the purification process.

There have been many systems proposed for the biological purification of various types of effluents. Most of the proposals have related to domestic sewage; there are a few systems presently in use for both domestic and industrial effluents. In a few cases, these systems have been adapted to the treatment of pulp and paper mill effluents. However, in all cases, there is not adequate provision for the disposal of surplus sludge and this defect, to a great extent, defeats the original purpose of attempting to dispose of the contaminating organic material in the effluent to be treated.

In the prior art of treating domestic and other effluent water, there has been proposed a two stage activated sludge process which is a continuous operation. In such a system, each stage comprises an aeration tank and a secondary settling tank. The return sludge circulates only within its own stage, i.e., part of the sludge from each settling tank is recirculated through its prior aeration tank. The effluent from the settling tank of the first stage serves as feed for the aeration tank of the second stage and the effluent from the settling tank of the second stage constitutes the purified effluent. In the aerating tank, the effluent water is aerated in the presence of micro organisms — i.e., activated sludge. Due to the bacterial activity, the organic impurities present in the effluent water are assimilated and decomposed. By controlling the oxygen content of each stage the nature/type of micro organism can be controlled so that the organisms of the second stage can feed on those of the first stage. The sludge in the settling tanks that is not recirculated, builds up and must be withdrawn as surplus sludge.

While the above process has been used for the treatment of domestic effluent water, even in this field problems have been encountered. In particular, the wrong type of micro organism or an improper balance in the various types of organism may cause difficulties in the sedimentation or settling tanks. In other words, to work at full efficiency, optimum conditions must be maintained in order to maintain the proper type of organisms at their optimum level. As will be understood by those skilled in this art, the life conditions of the various groups of organisms are markedly different and the proper conditions for each application have to be worked out.

It is an object of the present invention to provide a method for the disposal of sludge and like materials.

It is a further object of the present invention to provide a method to purify effluent waters and in particular, pulp and paper mill effluent waters.

It is a further object of the present invention to provide a method for the disposal of surplus sludge from a process for treating effluent waters and particularly pulp and paper mill effluent waters, which method disposes of the surplus sludge in an economic and efficient manner.

In one aspect of the present invention, there is provided a process for the treatment of sludge or like effluent, which process comprises the step of digesting the sludge during the digestion step of a pulping operation.

In a further aspect of the present invention, there is provided a process for the disposal of surplus sludge which comprises injecting said sludge into a digestion step of a pulping operation whereby, after said sludge is digested, a first portion thereof is retained as a part of the pulp yield and a second portion is digested and discharged as part of a spent liquor from said pulping operation. The surplus sludge for such a disposal process could come from a variety of sources, e.g. chemical or mechanical processes steps; microbiological purification processes including lagooning and other similar processes involving sedimentation techniques, etc.

In a still further aspect of the present invention, there is provided a process for the disposal of surplus sludge from a system which microbiologically purifies the spent liquor effluent from a pulping process by means of an activated sludge, comprising the step of injecting said surplus sludge into a digestion step of said pulping process whereby, after said sludge is digested, a first portion of said digested sludge is retained as part of the pulp yield, a second portion is discharged as a ventable gas, and a third portion is recycled through said system to serve as a nutrient for microbiological purification by said activated sludge.

In a still further aspect of the present invention, there is provided a process for the microbiological purification of spent pulping liquor effluent and other raw effluents from a pulp and paper mill which employs a wood digestion process, comprising the steps of continuously feeding raw effluent into a first aerating tank at a desired loading rate, aerating and decomposing in a first stage the organic material in said effluent using an activated concentrated sludge having a desired sludge and oxygen concentration and micro-organism composition to thereby form a first treated effluent, sedimenting said first treated effluent to form a treated first effluent and a sedimented sludge, recycling a first portion of the sedimented sludge from said first sedimenting step to said first aerating stage, taking a second portion of the sedimented sludge to form a first surplus sludge portion, aerating and decomposing the organic material in said treated first effluent to form a second treated effluent, sedimenting said second treated effluent, to form a sedimented sludge and a microbiologically purified effluent, recycling a first portion of the sedimented sludge from the sedimenting step to said second aerating stage, removing a second portion of the sedimented sludge to form a second surplus sludge portion, collecting said first and second surplus sludge portions and subjecting them to a digestion step of a wood digestion process.

In greater detail, the sludge to be disposed of may have been treated according to a single or double stage activated process as described hereinafter. Alternatively, the sludge may not have undergone any activated treatment and thus, sludges per se may be incorporated in the digestion step of a pulp digestion process.

In one embodiment of the invention, the raw organic material containing effluent is subjected to a pre-treatment process. In the case of an effluent from a pulp and paper mill, the process desirably includes the preparation of the raw effluent prior to treatment in a single or double stage purification process. In other words, prior to feeding the raw effluent to the first aerating tank and depending on the nature of the effluent to be treated, it has been found that particular conditions should be established in this preliminary treatment step. In such a preliminary treatment step, the removal or neutralization of coarse suspended solids and other substances such as free sulphur dioxide which could seriously affect proper subsequent microbiological growth of the bacteria is accomplished. This pre-purification may be accomplished by conventional means well known to those skilled in the related arts. As will be readily understood by those skilled in the art, in many situations, the coarse suspended solids will automatically be removed from the raw effluent due to the nature of the pulping operation — i.e., the blowing of digested pulp into blow pits where the raw effluent is drained off and the pulp mat so formed will itself filter most of the suspended solids.

Also, the pre-purification step may include a pH adjustment. Preferably, the pH may be adjusted by treating the effluent with a suitable alkali to achieve a pH range of between 7 to 9. This will automatically neutralize any free sulphur dioxide and as had been found, this range will discourage the formation of undesirable filamentous bacteria. In the case of acid digestion processes, substances such as free sulphur dioxide which are present in the cooking liquor will be removed to a large extent during the blowing operation. Many suitable alkalis are known for treating the effluent — e.g. lime, sodium carbonate, sodium hydroxide, ammonia, magnesium dioxide, etc. Use of ammonia is advantageous in that it will provide the nitrogen necessary for proper microbiological growth as will be discussed in greater detail hereinafter. In the case of an alkaline digestion process, such as the Kraft and Soda processes, the spent liquor effluent will already be alkaline and if it is necessary to adjust the effluent to a lower pH the use of inexpensive acidic phosphorous substances could be used to advantage as was the case for ammonia. Such a microbiological system could consist of a single or of multiple purification stages.

The pre-treated effluent is then conveyed to a first aeration tank at a total solids content preferably in the range of 1 to 3%, for most spent liquor effluents, this involved a B.O.D. range of 3,000–11,000 ppm. Such an aeration tank is conventional and well known to those skilled in the art and need not be discussed herein; however, the loading rate is preferably in the range of 200 to 500 lbs. B.O.D. per 1,000 cubic feet per day. In the first aeration tank, the mixed liquor suspended solids is preferably in the range of 4,000 to 10,000 ppm. In this respect, the term "BOD" is an art recognized term meaning the biological oxygen required which represents that amount of oxygen which is consumed by the micro organisms for decomposition of the organic impurities in a given effluent water within 5 days. The BOD value is commonly used to express the amount of decomposable substance in an effluent water. The detention time in the aeration tank will naturally depend on the degree of purification desired therein. Generally, in the process of the present invention, a detention time in the range of 18 to 36 hours has been found to be suitable.

It has been found desirable to minimize the amount of protozoa in the first aeration tank. To this end, the life conditions in the aerating tank are controlled such that bacteria but not the protozoa can freely develop. This may be done by controlling, among other parameters, the dissolved oxygen content in the effluent to an amount preferably not greater than 1.5 ppm. Thus, under such conditions, the organic material in the effluent is efficiently and continuously aerated and decomposed by the activated sludge.

Subsequently, the effluent is removed from the first aeration tank and conveyed to a first sedimentation tank for sedimentation of the sludge. The loading rate to the first sedimentation tank should preferably be below 45 pounds total solids per sq. ft. per day. Other sedimentation operating parameters are well known to those skilled in this art.

From the first sedimentation tank, a first portion of the sedimented sludge is removed and returned to the first aerating tank in order to maintain the proper sludge concentration therein.

A second portion of the sludge from the first sedimentation tank is removed in order to maintain the sludge in proper balance and avoid a build-up of the same therein. This second portion then becomes what will be called "surplus sludge" which will be further treated as discussed hereinafter.

A portion of the partially sedimented first treated effluent is then removed in order to maintain a proper liquid balance and which contains a minor portion of sediment. This treated effluent is then conveyed to a second aerating tank. The effluent water from the first sedimentation tank predominantly contains the bacteria which cannot be sedimented.

In the second aerating tank, the mixed liquor suspended solids should be in the range of 3,000 to 5,000 ppm. In contrast to the first aerating tank, the second aerating tank should provide a dissolved oxygen content in the effluent as high as possible and preferably greater than 2 ppm. The higher oxygen concentration will maintain the highest possible protozoa and lowest possible bacterial content. Because approximately one-half the B.O.D. has been removed in the first stage, the B.O.D. loading rate in the second stage aeration tank should be in the range of one-half the range in the first stage, i.e., 100 — 250 lbs. B.O.D. per 1,000 cubic feet per day. The detention time in the second aerating tank will depend on the desired B.O.D. of the purified effluent; in practice, a time in the range of 18 to 36 hours has been found suitable. As aforementioned, the percent protozoa should be as high as possible and the percent of microbacteria as low as possible. Filamentous organisms should be avoided if possible.

Subsequently, the thus treated effluent is removed to a second sedimentation tank.

In the second sedimentation tank, the loading rate is preferably not greater than 50 pounds per sq. ft. per day.

Following sedimentation, a first portion of the sludge is returned to the second aerating tank to maintain the required mixed liquor suspended solids. A further portion of the sludge is continuously removed to form a second part of the surplus sludge. Finally, the second treated effluent is removed therefrom to form the microbiologically purified effluent.

According to one embodiment of the present invention, the surplus sludges obtained from both the first and second sedimentation tanks are then employed in the digestion step of a pulping process. As one particular example, the surplus sludge may be mixed with softwood chips and a sodium bisulfite cooking liquor and the mixture cooked under normal mill digestion conditions. The spent liquor from the digestion step is then employed as the raw effluent fed to the pre-purification or the first aerating tank. The digestion step in the pulp process is well known per se and need not be discussed in greater detail herein. The amount of the surplus sludge injected into the digestion phase of the pulping process may be varied depending on the final product desired. Generally, it has been found that twenty percent (dry basis) or more of sludge to wood charged to the digestion may be employed without any significant loss in the physical properties of the pulp. For different sludges and pulp quality, more sludge can, of course, be injected into the digestion step. Naturally, the amount of sludge which can be incorporated in the digester will depend on the ultimate paper quality desired and as well, on operating parameters of the process such as, for example, the cooking temperature, the cooking time, etc.

As aforementioned, the sludge incorporated in the digester need not have undergone any preliminary treatment. Any suitable bio-mass may be employed according to the present invention.

As a result of the use of the sludge in the digestion or cooking phase of the pulping process, it has been found that a portion of the digested sludge is retained as part of the pulp yield. A second portion of the sludge is discharged as a ventable gas during the digestion and blowing steps while a third portion appears in the raw effluent to form a part of the B.O.D. component of the effluent. In this respect, it has been found that in certain cases and depending on the amount of sludge added, it is possible for the B.O.D. component of the effluent to increase by about 5%. Still further, it has been found that the third portion provides special bionutrient value to the effluent in the form of such materials as phosphorus and that part of the nitrogen which is not vented as a gas during the digestion step. These elements are required by the micro organisms for proper breeding/growth. In fact, even with the recycling of the sludge through the digestion step, further additions of nitrogen and phosphorus should be made on a continuous basis to maintain proper biological activity.

It has been found that the above process can operate fairly effectively over a substantial temperature range — e.g. 40° F. to 150° F. The heat derived from the raw effluent as it leaves the pulping plant together with the heat formed during the growth and activity of the micro organisms and the continuous nature of the process serves to maintain the process in an operable temperature range in most locations. However, whenever possible it is preferable to operate at the higher temperature level; this, for example, aids the sedimentation.

Surprisingly, it has been found that the disposal of reasonable amounts of the sludge in the digestion step of the pulping process does not significantly adversely affect the quality of the pulp produced. The process may be used in treating many other wastes. The mechanical pulping of wood chips is increasingly used and the large quantities of B.O.D. material are being released into pulp mills effluents. These B.O.D. materials are treatable by the above process. Similarly, small Kraft and other chemical or semi-chemical pulping mills which cannot economically recover the chemicals of their spent liquors by combustion processes (which recovers the heat value thereof) can use the present process to reduce the B.O.D. of the effluent. In fact, even those chemical pulping processes using chemical and heat recovery could still use the present process to advantage.

The following examples are illustrative of the invention.

EXAMPLE 1

An effluent from the blow pits (including the washings) of a high yield sodium-base sulfite pulping plant was fed to a first aerating tank at a B.O.D. loading rate of 300 pounds/1,000 cu.ft./day. The effluent after pretreatment had a percent solids (total) of 1.7; a pH of 7.5; and a B.O.D. of 6,500 ppm. The mixed liquor suspended solids in the first aeration tank was 7,000 mg/liter; the dissolved oxygen 1 ppm; the detention time was 32 hours. It was found that the micro organism composition was over 80% bacteria and the aeration was accomplished by bubbling air through the effluent in the tank.

The treated portion of the aerated and decomposed effluent was continuously removed from the first aeration tank and sent to a first sedimentation tank at a solids loading rate of 40 pounds/sq.ft./day.

After sedimentation, a first portion of the sedimented sludge was returned to the first aerating tank to maintain the required mixed liquor suspended solids and to maintain the sludge in balance. A second portion of the sedimented sludge was continuously removed to form a part of the surplus sludge while maintaining a proper liquid balance and a portion of the effluent was continuously removed and subjected to treatment in a second aerating tank.

In the second aerating tank, the organic material containing effluent was subjected to aeration and decomposition by an activated concentrated sludge at a B.O.D. loading rate of 300 pounds BOD/1,000 cu.ft./day under the following conditions:

TABLE I

| | |
|---|---|
| Mixed liquor suspended solids | 3,000 mg/liter |
| Dissolved oxygen | 3 ppm |
| pH | 7.5 |
| Detention time | 32 hours |
| The organism composition was over 80% protozoa. | |

The second treated effluent was continuously removed to a second sedimentation tank at a solids loading rate of 40 pounds/sq.ft./day and following sedimentation, a first part of the sedimented sludge was returned to the second aerating tank to maintain the desired mixed liquor suspended solids. A second portion of the sludge was removed to form a second surplus sludge while the treated effluent was continuously removed as a microbiologically purified effluent.

The two parts forming the surplus sludge were mixed with softwood chips and the sodium bisulfite cooking liquor and the mixture was cooked under normal mill digestion conditions as set forth in Examples 2 and 3.

EXAMPLE 2

Softwood chips with and without surplus sludge were cooked in digesters to produce a high yield sodium base bisulfite pulp. Samples of pulp and spent liquor were collected and tested. Cooked chips were disintegrated in a Cowles' dissolver, washed in a centrifuge and pulp yield determined. Pulps were refined in a PFI mill and tested. The results are summarized in Table II below:

TABLE II

|  | CONTROL | WITH SLUDGE |
| --- | --- | --- |
| Sludge, % O.D. wood basis | nil | 2.5 |
| Yield, Pulp % | 73.9 | 73.8 |
| B.O.D., ppm | 34,158 | 33,750 |
| Burst factor | 49 | 50 |
| Tear factor | 91 | 89 |
| Brightness, % | 48.7 | 48.2 |

As may be seen from the above, the results show that the surplus sludge incorporated during digestion has not affected the pulp's quality and surprisingly, there has not been a recordable increase in the B.O.D. of the spent liquor, any small increase in B.O.D. being masked by other variations.

EXAMPLE 3

Softwood chips with and without sludge were cooked (three runs each) in a digester to produce a high yield sodium-base bisulfite pulp. Afterwards, the cooking digesters were cooled overnight and spent liquor drained and measured. Effluent liquor was tested for B.O.D., nitrogen and phosphorus. Cooked chips were disintegrated, washed and tested. The results of the averages of the three runs are shown in Table III.

TABLE III

|  | CONTROL | WITH SLUDGE |
| --- | --- | --- |
| Sludge, % O.D. wood basis | nil | 3.8 |
| Pulp Yield, % O.D. | 70.7 | 71.8 |
| B.O.D., ppm | 32,000 | 33,000 |
| Nitrogen, ppm | — | 29 |
| Phosphorus, ppm | 5 | 69 |
| Burst factor | 41 | 45 |
| Tear factor | 106 | 104 |
| Brightness, % | 45.3 | 46.6 |

As will be seen, the 3.8% of sludge does not have a significant effect on the pulp quality. There is a slight increase in the B.O.D. of the effluent liquor. It was noted that 20 to 25% of phosphorus was recovered in the pulping process.

EXAMPLE 4

Hardwood chips (mix of birch, maple and poplar) with and without sludge were cooked in a digester to produce a neutral sulphite semi-chemical (NSSC) pulp. The pulp and liquor were tested and the results are as shown in Table IV.

TABLE IV

|  | CONTROL | WITH SLUDGE |
| --- | --- | --- |
| Sludge % O.D. wood basis | nil | 3.0 |
| Pulp Yield, % | 82.2 | 82.6 |
| B.O.D. ppm | 26,330 | 29,000 |
| Burst factor | 29 | 27 |
| Stretch % | 2.01 | 2.06 |
| CMT, lbs. | 52 | 48 |

EXAMPLE 5

Softwood chips (spruce and balsam) with and without sludge were cooked in a digester to produce a Kraft pulp. The pulp was tested and results are shown in Table V.

TABLE V

|  | CONTROL | WITH SLUDGE |
| --- | --- | --- |
| Sludge % O.D. wood basis | nil | 3.0 |
| Pulp Yield, % | 47.7 | 49.2 |
| K no | 18.3 | 21.3 |
| Burst factor | 77 | 71 |
| Tear factor | 122 | 121 |
| Fold (1.5 Kg) | 550 | 543 |
| Brightness, % | 25.7 | 23.0 |
| B.O.D., ppm | 48,000 | 53,700 |

The results shown in the above tables suggest that the sludge might have a slightly greater effect on the pulp when cooking at the lower yields. Also, the effect on B.O.D. appears to be greater when the pH of the cooking conditions is closer to neutral. However, some of these effects can be corrected by adjustments in the cooking conditions.

EXAMPLE 6

The spent liquor effluent from a high yield sodium-base bisulfite cook was fed to a single stage activated sludge process and the surplus sludge from this single stage was combined with softwood chips to produce a high yield sodium base bisulfite pulp. The results of the cook (one with and one without the sludge) are shown in Table VI.

TABLE V

|  | CONTROL | SINGLE STAGE |
| --- | --- | --- |
| Sludge on wood chips % | 0 | 2.6 |
| Total SO₂ applied % |  | 12 |
| L/W ratio |  | 5/1 |
| Temperature ° C |  | 155 |
| Time to temp. minutes |  | 120 |
| Time at temp. minutes |  | 75 |
| Results: |  |  |
| i) Spent liquor |  |  |
| B.O.D. ppm | 23,245 | 27,590 |
| Nitrogen ppm | nil | 3.5 |
| Phosphorus ppm | nil | 67 |
| Total solids % | 8.22 | 8.51 |
| ii) Pulp |  |  |
| Yield % | 75.3 | 76.3 |
| Refining Energy HPD/ADTP | 51 | 51 |
| Rejects % | 2.63 | 3.95 |
| Freeness (unscreened) ml | 648 | 656 |
| Bulk cc/g | 1.88 | 1.92 |
| Burst factor | 57 | 52.4 |
| Tear factor | 82 | 86 |
| Breaking Length Km | 9.3 | 9.1 |
| Stretch % | 2.1 | 2.2 |
| Fold (1.0 Kg) | 286 | 313 |
| Porosity, ml/min | 4,180 | 5,090 |
| Smoothness ml/min | 795 | 768 |
| Opacity % | 86.4 | 87.4 |
| Brightness % | 37.6 | 36.4 |

As can be seen, the process of the present invention is as applicable to the sludge from a single stage activated sludge process as it is to that from a two stage activated sludge process.

EXAMPLE 7

The spent effluent from a refiner groundwood (mechanical) pulping process was fed both to a single stage activated sludge process and to a two stage activated sludge process. The surplus sludges from these two processes were separately cooked with softwood chips to produce a high yield sodium base bisulfite pulp and the results are shown in Table VII.

TABLE VII

|  | CONTROL | SINGLE STAGE | TWO STAGE |
|---|---|---|---|
| Sludge on wood chips % | 0 | 2.5 | 2.5 |
| Total SO$_2$ applied % | ← | 12 | → |
| L/W ratio |  | 5/1 |  |
| Temperature ° C |  | 155 |  |
| Time to temp. minutes |  | 120 |  |
| Time at temp. minutes |  | 75 |  |
| Results: |  |  |  |
| i) Spent liquor: |  |  |  |
| B.O.D. ppm | 23,245 | 25,495 | 26,505 |
| Nitrogen ppm | nil | nil | nil |
| Phosphorus ppm | nil | 25 | 50 |
| TOTAL Solids % | 8.22 | 7.87 | 8.03 |
| ii) Pulp: |  |  |  |
| Yield % | 75.3 | 76.1 | 75.5 |
| Refining Energy HPD/ADTP | 51 | 60 | 60 |
| Rejects % | 2.63 | 3.83 | 3.85 |
| Freeness (unscreened) ml | 648 | 653 | 657 |
| Bulk cc/g | 1.88 | 1.86 | 1.91 |
| Burst factor | 57 | 55 | 54 |
| Tear factor | 82 | 87 | 84 |
| Breaking Length Km | 9.3 | 8.8 | 9.3 |
| Stretch % | 2.10 | 2.21 | 2.39 |
| Fold (1.0 Kg) | 286 | 283 | 302 |
| Porosity, ml/min | 4,180 | 4,930 | 4,850 |
| Smoothness ml/min | 795 | 705 | 725 |
| Opacity % | 86.4 | 84.0 | 83.8 |
| Brightness % | 37.6 | 39.1 | 38.7 |

As before, it can be seen that the present invention is applicable to the sludge from either a single or two stage sludge process, and in addition, it can also be used on effluents emanating from the mechanical pulping of wood.

EXAMPLE 8

In the above examples, the sludges used were from a single or double stage activated sludge process. However, the present invention is applicable to sludges which are present "as is" — i.e., without any preliminary treatment. For example, in the pulp and paper process complex, bio-masses which are often left to accumulate, eventually find their way into the surrounding environment which they proceed to pollute. The present invention, on the other hand, makes it possible to dispose of these bio-masses in an easy and efficient way. The results of such a method are shown in following Table VIII where such a sludge is added "as is" to softwood chips and the combination cooked in a digester to produce a high yield sodium-base bisulfite pulp.

TABLE VIII

|  | CONTROL | MILL SLUDGE |
|---|---|---|
| Sludge on wood chips % | 0 | 2.1 |
| Total SO$_2$ applied % | 12 |  |
| L/W ratio | 5/1 |  |
| Temperature ° C | 155 |  |
| Time to temp. minutes | 120 |  |
| Time at temp. minutes | 75 |  |
| Results: |  |  |
| i) Spent liquor: |  |  |
| B.O.D. ppm | 23,245 | 22,785 |
| Total Solids % | 8.22 | 8.05 |
| ii) Pulp: |  |  |
| Yield % | 75.3 | 74.2 |
| Refining Energy HPD/ADTP | 51 | 50 |
| Rejects % | 2.63 | 3.28 |
| Freeness (unscreened) ml | 648 | 642 |
| Bulk cc/g | 1.88 | 1.92 |
| Burst Factor | 57 | 55 |
| Tear Factor | 82 | 85 |
| Breaking Length Km | 9.3 | 9.3 |
| Stretch % | 2.10 | 2.13 |
| Fold (1.0 Kg) | 286 | 235 |
| Porosity ml/min | 4,180 | 4,070 |
| Smoothness ml/min | 795 | 845 |
| Opacity % | 86.4 | 85.0 |
| Brightness % | 37.6 | 38.1 |

EXAMPLE 9

As a further example to that of No. 8, a sludge from a pulp mill lagoon was taken and added "as is" to softwood chips and the mixture cooked in a digester to produce a high yield sodium-base bisulfite pulp. The results of the cooks are given in Table IX.

TABLE IX

|  | CONTROL | LAGOON |
|---|---|---|
| Sludge on wood chips % | 0 | 2.4 |
| Total SO$_2$ applied % | 12 |  |
| L/W ratio | 5/1 |  |
| Temperature ° C | 155 |  |
| Time to temp. minutes | 120 |  |
| Time at temp. minutes | 75 |  |
| Results: |  |  |
| i) Spent Liquor: |  |  |
| B.O.D. ppm | 23,245 | 22,360 |
| Nitrogen ppm | nil | nil |
| Phosphorus ppm | nil | nil |
| Total Solids % | 8.22 | 8.20 |
| ii) Pulp: |  |  |

TABLE IX-continued

|  | CONTROL | LAGOON |
|---|---|---|
| Yield % | 75.3 | 76.0 |
| Refining Energy HPD/ADTP | 51 | 54 |
| Rejects % | 2.63 | 3.19 |
| Freeness (unscreened) ml | 648 | 651 |
| Bulk cc/g | 1.88 | 1.86 |
| Burst Factor | 57 | 58 |
| Tear Factor | 82 | 83 |
| Breaking Length Km | 9.3 | 9.8 |
| Stretch % | 2.1 | 2.4 |
| Fold (1.0 Kg) | 286 | 315 |
| Porosity ml/min | 795 | 800 |
| Smoothness ml/min | 86.4 | 84.2 |
| Opacity % | 86.4 | 84.2 |
| Brightness % | 37.6 | 36.2 |

Thus, as has been shown by the above Examples, the process of the present invention can be used to dispose of a variety of sludges which generally tend to contaminate the effluent waters emanating from pulp and paper mills. The disposal of these sludges is also undertaken in an economic and efficient manner.

EXAMPLE 10

In the present invention the amount of sludge (as a % of the o.d. wood) can be varied over a wide range without affecting the quality of the pulp etc. Experiments have shown that this percentage can be at a relatively high level without any drastic effect on pulp quality. In the experiment similar to that of Examples 2 and 3, combined surplus sludge was added to the softwood chips at a level of 10%. The results are shown in Table X.

TABLE X

|  | CONTROL | TWO STAGE |
|---|---|---|
| Sludge on wood chips % | 0 | 10 |
| Total SO$_2$ applied % | 12 | |
| L/W ratio | 5/1 | |
| Temperature ° C | 155 | |
| Time to temp. minutes | 120 | |
| Time at temp. minutes | 75 | |
| Results: | | |
| i) Spent liquor: | | |
| B.O.D. ppm | 30,805 | 29,790 |
| Nitrogen ppm | — | 116 |
| Phosphorus ppm | — | 194 |
| Total Solids % | 11.42 | 10.31 |
| ii) Pulp: | | |
| Yield % | 75.6 | 80.1 |
| Refining Energy HPD/ADTP | 35 | 57 |
| Rejects % | 6.7 | 4.1 |
| Freeness (unscreened) ml | 657 | 680 |
| Bulk cc/g | 2.02 | 1.92 |
| Burst Factor | 48 | 42 |
| Tear Factor | 81 | 86 |
| Breaking length Km | 9.5 | 8.1 |
| Stretch % | 2.29 | 2.06 |
| Fold (1.0 Kg) | 180 | 157 |
| Porosity ml/min | 6,000 | 6,000 |
| Smoothness ml/min | 1,400 | 1,020 |
| Opacity % | 80.2 | 82.2 |
| Brightess % | 35.5 | 37.2 |

EXAMPLE 11

Here, Example No. 4 above was repeated using 20% sludge, and the results are shown in the following:

TABLE XI

| Sludge % O.D. Wood basis | Nil | 20 |
|---|---|---|
| Pulp Yield % | 71.0 | 80.0 |
| B.O.D. ppm | 26,000 | 24,500 |
| Burst factor | 28 | 22 |
| Stretch % | 2.0 | 1.8 |
| CMT lb | 50 | 45 |

As may be seen from the above, a 20% sludge addition does represent a practical embodiment. While the physical results are lower, the use of the final product will dictate the percent of sludge which can be used. Furthermore, as will be understood by those skilled in the art, the physical properties could be increased by varying the cooking conditions to counteract the effect of the sludge.

It will be understood that the above examples are for purposes of illustration and not limiting of the invention. Also, it will be understood that changes and modifications may be made to the above described embodiments without departing from the spirit and scope of the invention.

We claim:

1. A process for the microbiological purification of organic material containing spent pulping liquor effluent from a pulp and paper mill employing a wood digestion process comprising the steps of:
   A. aerating and decomposing in a first aerating stage the organic material in said effluent with an activated concentrated sludge having a desired sludge concentration to form a first treated effluent;
   B. conveying said first treated effluent to a first sedimentation stage to form a sedimented sludge and a treated first effluent;
   C. removing from said first sedimentation stage
      a. a first portion of the sedimented sludge and returning said first portion to the first aerating stage to maintain said desired sludge concentration therein; and
      b. a second portion of the sedimented sludge to form a first part of a surplus sludge;
   D. aerating and decomposing in a second aerating stage said treated first effluent from said first sedimentation stage to form a second treated effluent;
   E. conveying said second treated effluent to a second sedimentation stage to form a sedimented sludge and a microbiologically purified effluent;
   F. removing from said second sedimentation stage
      a. a first portion of the sedimented sludge and returning said first portion to the second aerating stage;
      b. a second portion of the sedimented sludge to form a second part of a surplus sludge; and
      c. the microbiologically purified effluent; and then
   G. collecting said first and second surplus sludge parts and subjecting them in an amount up to 20% based on O.D. wood to a digestion step of a wood pulping operation.

2. The process of claim 1 including the step of pretreating said organic material containing effluent to remove coarse suspended solids.

3. The process of claim 2 additionally including the step of adjusting the pH of said organic material containing effluent prior to step (A) to have a pH of between 7 to 9.

4. The process of claim 1 wherein said organic material containing effluent is fed to step (A) at a loading rate of between 200 and 500 pounds B.O.D. per 1,000 cu.ft. per day and said organic material containing effluent has between 1% to 3% total solids.

5. The process of claim 1 wherein said organic material containing effluent is aerated in step (A) for between 18 to 36 hours so as to provide a dissolved oxygen content in said effluent of less than 1.5 ppm and the mixed liquor suspended solids in step (A) is in the range of 5,000 – 10,000 ppm.

6. The process of claim 1 wherein said effluent from step (A) is conveyed to said first sedimentation stage at a loading rate less than 45 pounds of total solids per sq.ft. per day.

7. The process of claim 1 wherein said effluent in step (D) is aerated for between 18 to 36 hours so as to provide a dissolved oxygen content in said effluent of greater than 2 ppm, and the mixed liquor suspended solids in step (D) is in the range of 3,000 to 5,000 ppm.

8. A process suitable for the disposal of surplus sludge from a wood pulping process comprising the step of injecting said surplus sludge into the digestion step of the wood pulping process whereby said sludge is digested and a wood pulp is formed, a first portion of said digested sludge being retained as a part of the pulp yield, a second portion of said digested sludge being discharged as a ventable gas, and a third portion of said digested sludge being employed as a nutrient for the microbiological purification of spent pulping liquor effluent with an activated sludge.

9. A process for the microbiological purification of organic material containing spent pulping liquor effluent from a pulp and paper mill employing a wood digestion process comprising the steps of:
   A. pre-treating said effluent to remove coarse suspended solids and adjusting the pH and chemical composition of the effluent;
   B. aerating and decomposing in a first aerating stage the organic material in the pre-treated effluent with an activated concentrated sludge, having a desired sludge and oxygen concentration and micro-organism composition, to form a first treated effluent;
   C. conveying said first treated effluent to a first sedimentation stage to form a sedimented sludge and a treated first effluent;
   D. removing from said first sedimentation stage
      a. a first portion of the sedimented sludge and returning said first portion to said first aerating stage to maintain said desired sludge concentration therein; and
      b. a second portion of the sedimented sludge to form a first part of a surplus sludge;
   E. aerating and decomposing in a second aerating stage said treated first effluent with an activated concentrated sludge and under conditions to maximize the content of protozoa and minimize the content of bacteria and to form a second treated effluent;
   F. conveying said second treated effluent to a second sedimentation stage to form a sedimented sludge and a microbiologically purified effluent;
   G. removing from said second sedimentation stage
      a. a first portion of said sedimented sludge and returning said first portion to said second aerating stage;
      b. a second portion of said sedimented sludge to form a second part of a surplus sludge; and
      c. the microbiologically purified effluent; and then
   H. collecting said first and second surplus sludge parts to form a surplus sludge and injecting said surplus sludge in an amount up to 20% based on O.D. wood into a digestion step of a wood pulping process to digest said sludge and form a wood pulp whereby a first portion of said digested sludge is retained as a part of the pulp yield, a second portion of said digested sludge is discharged as a ventable gas, and a third portion of said digested sludge is employed as a part of said spent pulping liquor effluent to serve as a nutrient in the microbiological purification operation.

10. The process of claim 9 wherein said effluent is conveyed to said first aerating stage at a loading rate of 200 to 500 pounds B.O.D. per 1,000 cu.ft. per day and having 1 to 3% total solids and a pH in the range of between 7 to 9.

11. The process of claim 9 wherein the dissolved oxygen content in said first treated effluent is less than 1.5 ppm and in said second treated effluent, greater than 2 ppm.

12. A process suitable for the disposal of surplus sludge from a system which microbiologically purifies spent pulping liquor effluent from a wood pulping process comprising the step of injecting said surplus sludge into the digestion step of the wood pulping process whereby said sludge is digested and a wood pulp is formed, a first portion of said digested sludge being retained as a part of the pulp yield, a second portion of said digested sludge being discharged as a ventable gas, and a third portion of said digested sludge being recycled through said system to serve as a nutrient for the microbiological purification of spent pulping liquor effluent with an activated sludge.

* * * * *